United States Patent
Rowson et al.

(10) Patent No.: US 8,255,953 B1
(45) Date of Patent: Aug. 28, 2012

(54) ARRANGEMENT OF CONTENT WITHIN A CUSTOM TELEVISION CHANNEL

(75) Inventors: James A. Rowson, Fremont, CA (US); Richard C. Gossweiler, III, Santa Clara, CA (US); Kurt W. MacDonald, Los Angeles, CA (US)

(73) Assignee: Hewlett-Packard Devlopment Company, L.P., Houston, TX (US)

( * ) Notice: Subject to any disclaimer, the term of this patent is extended or adjusted under 35 U.S.C. 154(b) by 2166 days.

(21) Appl. No.: 11/174,260

(22) Filed: Jun. 30, 2005

(51) Int. Cl.
G06F 3/00 (2006.01)

(52) U.S. Cl. ............... 725/47; 725/39; 725/44

(58) Field of Classification Search .......... 725/39, 725/47
See application file for complete search history.

(56) References Cited

U.S. PATENT DOCUMENTS

| | | | |
|---|---|---|---|
| 2002/0152465 A1* | 10/2002 | Khoo et al. | 725/46 |
| 2003/0023975 A1* | 1/2003 | Schrader et al. | 725/51 |
| 2004/0040038 A1* | 2/2004 | Sasaki et al. | 725/44 |
| 2005/0155063 A1* | 7/2005 | Bayrakeri et al. | 725/47 |
| 2006/0267995 A1* | 11/2006 | Radloff et al. | 345/530 |
| 2009/0019485 A1* | 1/2009 | Ellis et al. | 725/40 |

* cited by examiner

*Primary Examiner* — Brian Pendleton
*Assistant Examiner* — Jean D Saint Cyr

(57) ABSTRACT

Techniques for content arrangement with a custom television (TV) channel in a custom TV system for providing a viewer with custom channels of content based on viewer preferences is described. Various examples of channel content ordering criteria upon which arrangement of content selections within a custom TV channel is based are also described. The custom TV system is suitable for execution on a digital video recorder.

24 Claims, 5 Drawing Sheets

| Channel | Today's News | Ads | Previews of News Related Shows | Today's News Talk Shows | Previous News Talk Shows (Reverse Chronological Order) | | | | | |
|---|---|---|---|---|---|---|---|---|---|---|
| News | Local News Show / News Channel ID · National News Show / News Channel ID · World News Show / News Channel ID | Ads / News Channel ID | Preview News 1 / News Channel ID · Preview News 2 / News Channel ID · Preview News 3 / News Channel ID · Preview News 4 / News Channel ID · Preview News 5 / News Channel ID | Hardball / News Channel ID · O'Reilly Factor / News Channel ID · CrossFire / News Channel ID | Hardball / News Channel ID · O'Reilly Factor / News Channel ID · CrossFire / News Channel ID · Hardball / News Channel ID · O'Reilly Factor / News Channel ID · CrossFire / News Channel ID | | | | | |

| Channel | Unplayed Episodes | | | Previews of Other Drama Shows | Played Episodes | | |
|---|---|---|---|---|---|---|---|
| | Unplayed ER Episodes (Chronological) | Ads | Unplayed CSI Episodes (Chronological) | | Played ER Episodes (Chronological) | Ads | Played CSI Episodes (Chronological) |
| Drama | Episode 4 / Drama Channel ID · Episode 5 / Drama Channel ID · Episode 6 / Drama Channel ID | Ads / Drama Channel ID | Episode 4 / Drama Channel ID · Episode 5 / Drama Channel ID · Episode 6 / Drama Channel ID | Preview Drama 1 / Drama Channel ID · Preview Drama 2 / Drama Channel ID · Preview Drama 3 / Drama Channel ID | Episode 1 / Drama Channel ID · Episode 2 / Drama Channel ID · Episode 3 / Drama Channel ID | | Episode 1 / Drama Channel ID · Episode 2 / Drama Channel ID · Episode 3 / Drama Channel ID |

| Channel | G-Rated Movies (Most Recently Downloaded) | Previews of Other Kids Movies |
|---|---|---|
| Kids Movie Channel | Peter Pan / Kids Movie Ch. ID · Anne of Green Gables / Kids Movie Ch. ID · Kids Movie Ch. ID · Tales of Narnia 1 / Kids Movie Ch. ID · Tales of Narnia 2 / Kids Movie Ch. ID · Tales of Narnia 3 / Kids Movie Ch. ID · NeverEnding Story / Kids Movie Ch. ID · NeverEnding Story 2 / Kids Movie Ch. ID | Preview Kids Movie 1 / Kids Movie Ch. ID · Preview Kids Movie 2 / Kids Movie Ch. ID · Preview Kids Movie 3 / Kids Movie Ch. ID |

| Channel | Unplayed Episodes (Most Recently Downloaded) | Ads | Previews Of Other Comedies | Played Episodes (Highest Viewer Rating Plus Time) |
|---|---|---|---|---|
| Comedy | Cheers Ep. 5 S. 1 / Comedy Channel ID · Joey Ep. 6 S. 2 / Comedy Channel ID · Friends Ep. 10 S. 4 / Comedy Channel ID | Ads / Comedy Channel ID | Preview Comedy 1 / Comedy Channel ID · Preview Comedy 2 / Comedy Channel ID · Preview Comedy 3 / Comedy Channel ID · Preview Comedy 4 / Comedy Channel ID · Preview Comedy 5 / Comedy Channel ID | Joey Ep. 2 S. 2 / Comedy Channel ID · Cheers Ep. 7 S. 11 / Comedy Channel ID · Cheers Ep. 8 S. 10 / Comedy Channel ID |

| Channel | Unplayed House Tours (Most Recent Postings) | Previews of House Tours to Come | Played House Tours (Rating Plus Time to Live) |
|---|---|---|---|
| Real Estate Channel | Address 7 / RE Channel ID · Address 6 / RE Channel ID · Address 5 / RE Channel ID | Preview Address 1 / RE Channel ID · Preview Address 2 / RE Channel ID · Preview Address 3 / RE Channel ID · Preview Address 4 / RE Channel ID · Preview Address 5 / RE Channel ID | Address 1 / RE Channel ID · Address 2 / RE Channel ID · Address 3 / RE Channel ID · Address 4 / RE Channel ID |

ARRANGEMENT OF CONTENT WITHIN A CUSTOM TELEVISION CHANNEL

BACKGROUND

Broadcast television providers, some examples of which are cable systems, satellite systems and over the air broadcast providers provide content such as a show as a single selection at a certain time in a certain channel. Viewers have used video cassette recorders (VCRs) and digital video recorders (DVRs) such as personal video recorders (PVRs) to record individual shows that appeal to their specific tastes from the smorgasbord of available shows.

Custom television refers to providing a viewer with channels defined for the viewer based on the viewer's personal preferences and/or the tastes of viewers sharing similar demographics with the viewer. A custom channel can include multiple content selections at the same time from which a viewer can choose. It is desirable that the arrangement of recorded and broadcast content selections within a custom channel can be used to ease a viewer's search for desired content and to present selections in a manner consistent with the viewer's preferences.

SUMMARY

The present invention provides one or more embodiments of solutions for arranging content selections within a custom TV channel according to content ordering criteria. In one example, the content ordering criteria is based on the genre of the content within a custom channel. In other examples, the content ordering criteria is based on viewer preferences, similar viewers' preferences, or a combination of both.

The features and advantages described in this summary and the following detailed description are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

FIG. 3 illustrates an example of a custom channel model for relating content selections to channels which further illustrates some examples of arrangements of the respective content selections for each channel in accordance with some examples of content ordering criteria in accordance with the present invention.

The figures depict embodiments of the present invention for purposes of illustration only. One skilled in the art will readily recognize from the following discussion that other embodiments of the structures and methods illustrated herein may be employed without departing from the principles of the invention described herein.

DETAILED DESCRIPTION OF THE DRAWINGS

Figure 1:
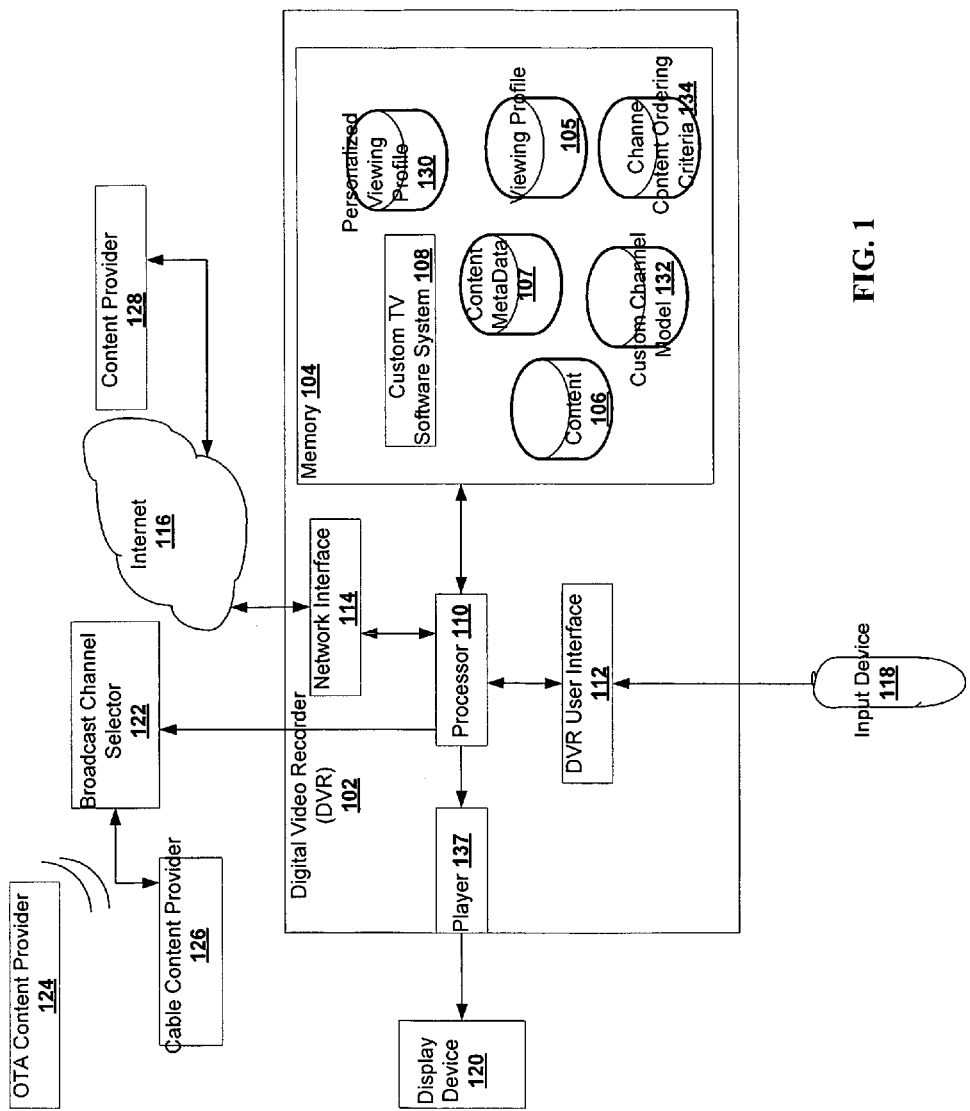
FIG. 1 is an architectural block diagram of an example context, a digital video recorder, including a system for arranging content selections within a custom TV channel according to content ordering criteria in accordance with an embodiment of the present invention.

FIG. 1 is an architectural block diagram of an example context, a digital video recorder 102, including in its memory 104 a system for arranging content selections within a custom TV channel according to content ordering criteria in accordance with an embodiment of the present invention. The digital video recorder 102 comprises a processor 110 having access to a memory 104 (e.g. hard disk), and which is communicatively coupled to each of the following: a network interface 114 through which content metadata and content can be accessed from a content provider 128 some examples of which are a photo respository, a sports website, or a family video collection; a broadcast channel selector 122 through which content metadata and content from a content provider such as the illustrated examples of a cable content provider 126 and an over the air (OTA) content provider 124 can be accessed; a DVR user interface 112 for handling inputs from an input device 118 such as a remote control; and a player 137 which renders video (e.g., recorded shows, streamed broadcasts) for presentation to a viewer on display device 120.

The memory 104 comprises custom TV software 108 and data storage modules 130, 106, 107, 105, 132, 134 for use by the custom TV software 108 to provide defined channels of content tailored to a viewer and for ordering the content within each defined channel. In addition to the defined channels, broadcast channels can also be supported. The data storage modules comprise a personalized viewing profile 130, a viewing profile 105 including data on viewing habits of other viewers with similar behavior patterns or demographic information, content meta data storage modules 107 which can include meta data downloaded for selected content as well as meta data for review in order to select content, content storage module 106 making up the content selections, some examples of which are shows, previews, commercials, personal slide shows or videos, photographs, and audio selections, a custom channel model 132 which links a channel with its one or more content selections, and channel content ordering criteria 134 which includes criteria for the arrangement of content selections within at least one custom channel.

Figure 2:
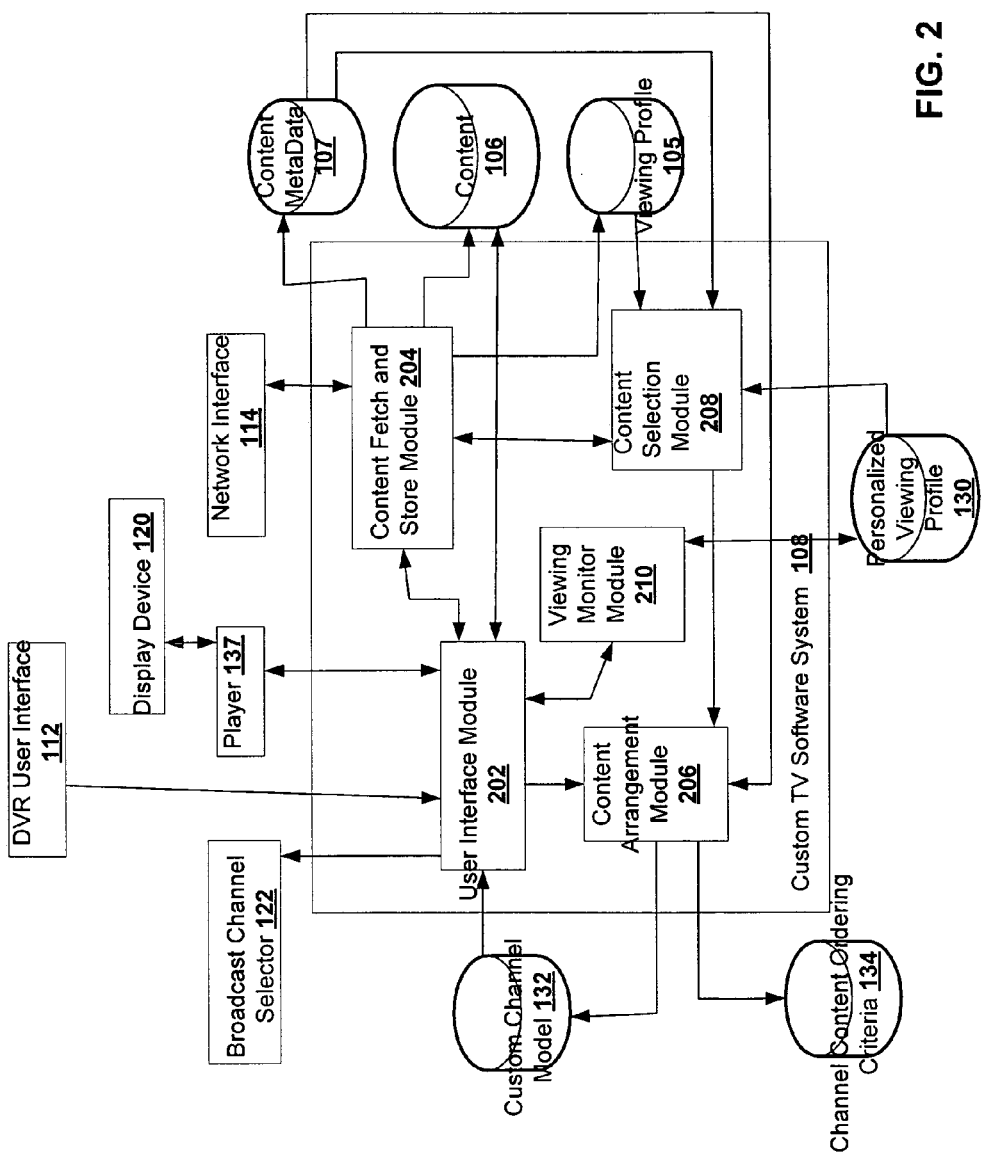
FIG. 2 is a software architectural block diagram of a custom TV system including a content arrangement module for arranging content selections within a custom TV channel according to content ordering criteria in accordance with an embodiment of the present invention.

FIG. 2 is a software architectural block diagram of a custom TV system including a content arrangement module 206 for arranging content selections within a custom TV channel according to content ordering criteria in accordance with an embodiment of the present invention. As illustrated in FIG. 1, the custom TV software system 108 and its associated custom TV data storage modules 105, 106, 107, 130, 132, 134 can be stored locally on a digital video recorder (e.g., 102); however, the custom TV software system 108 can execute in whole or in part on another processor in a networked computer such as a personal computer or a server. Similarly, the associated custom TV data storage modules 105, 106, 107, 130, 132, 134 can be stored at least in part in a memory accessible via a network connection to the digital video recorder (e.g. 102). The custom TV software system 108 comprises a user interface module 202, a viewing monitor module 210, a content selection module 208, a content fetch and store module 204, as well as the content arrangement module 206.

The custom channel model 132 can include TV channels from a palette of pre-built channels, broadcast channels or channels created specifically for the viewer. Some examples of custom channels created for the viewer are a channel about a favorite sports team, a channel about local and national news on topics significant to a viewer, a channel of video and still image collections of the viewer's family, a preview channel for showing previews of movies, or an advertising channel devoted to car advertisements.

A viewing monitor module 210 via the communicatively coupled user interface module 202 can directly collect information from a viewer from which personal preferences can be determined, for example by responding to questions on the display device 120 (e.g., television screen) with a remote control (e.g. 118). The viewing monitor module 210 stores the information in a personalized viewing profile 130. Additionally, the viewing monitor receives from the user interface module 202 which content selections were picked by the viewer and how much of a content selection was played which information the user interface module 202 determines based on information received from the player 137. In this manner, the viewing monitor module 210 can monitor which content selections are being viewed, and can add this viewing information to the personalized viewing profile 130.

The content selection module 208 has access to the personalized viewing profile 130 and a demographic viewing profile 105. Based on these profiles, the content selection module 208 can select content available from content providers. In one example, based on the personalized viewing profile 130 and the demographic viewing profile 105, the content selection module 208 performs recommendation engine techniques such as collaborative filtering for identifying new content selections a viewer may like. The content selection module 208 can also perform searches based on the viewer's personalized viewing profile 130 and/or based on direct search criteria provided by the viewer (e.g., shows about mountain climbing, a specific comedy series, a selection for local news preference rather than national news.) The content selection module 208 communicates search criteria (e.g. queries) to the communicatively coupled fetch and store module 204.

The fetch and store module 204 is communicatively coupled to a network interface 114 through which it can access computers (e.g., servers at content providers 124, 126, 128) for searching content metadata databases with the search criteria. An example of a content metadata database would be a programming guide of the cable provider for the broadcast channels in the cable package for a viewer. The fetch and store module 204 retrieves metadata for content selections that match the search requirements and stores this metadata in the accessible content meta data storage module 107. In another embodiment, the schedule of listings for the day's programming for the broadcast channels in the cable package for a viewer is downloaded into the content meta data storage module 107 as part of a schedule service provided by a service such as Tivo®. Additionally, other content meta data can also be added to the content metadata storage module 107 that is fetched by the fetch and store module 204. The content selection module 208 accesses the content meta data storage module 107 to select content selections to add to one or more custom channels and categorizes the content selections for a respective custom channel based on their meta data. Once new content selections are chosen, the content selection module 208 requests the fetch and store module 204 to retrieve the content selections and store them in the content storage module 106. The fetch and store module 204 can retrieve content selections available via the network interface 114 or can schedule with the user interface module 202 to set a broadcast channel selector 122 to a broadcast channel at a time slot for recording of a content selection.

The content selection module 208 communicates to the content arrangement module 206 that new content selections are available for insertion into the custom channel model 132 and provides references to the metadata and storage locations for the new selections. The content arrangement module 206 arranges each content selection at an order position in a playlist of an associated custom TV channel according to the accessible stored channel content ordering criteria 134 for the associated custom TV channel. Additionally, the user interface module 202 can send user input to the content arrangement module 206 indicating a change in a channel's content ordering criteria 134 which the arrangement module 206 updates and adjusts the order of the playlist in the custom channel model 132 for the effected channel. Similarly, the user interface module 202 can send user input indicating a change in the playlist order of content selections for a channel causing the content arrangement module 206 to adjust the playlist for that channel in the custom channel model 132 accordingly. In one example, for each content selection associated with a channel's playlist, the custom channel model 132 includes meta-data for the content selection and a reference to its storage location in the content storage module 106.

Furthermore, as the content storage module 106 reaches its allowed memory space, the content arrangement module 206 deletes content selections in accordance with the content ordering criteria 134 for each channel or in accordance with a content deletion criteria based upon the content ordering criteria for the channel.

Channel content ordering criteria 134 can use a variety of bases upon which to organize content selections within a custom channel. Some illustrative examples of criteria are chronology with respect to another criteria such as chronology or order for a TV series or movie series, chronology of being recorded, order of being played, order of being broadcast on either broadcast television or the Internet, clustered chronology, viewer's typical viewing order, whether the content selection has been played or not, viewer ratings, ratings for age appropriateness used by the television industry, a time to live parameter associated with a selection, and most recently downloaded, and combinations of these criteria. Some more examples of criteria include the source of the content, for example high definition television (HDTV) selections come first before standard TV selections which come before Internet content. Additionally, different ordering criteria can be applied to sub-units of content selections within a channel.

Each of the modules illustrated in FIG. 2 or a portion thereof can be implemented in software suitable for execution on a processor and storage in a computer-usable medium, hardware, firmware or any combination of these. Computer-usable media include any configuration or medium capable of storing or transferring programming, data, or other digital information. Examples of computer-usable media include a data transmission as well as various memory embodiments such as random access memory and read only memory, which can take a variety of forms, some examples of which are a hard disk, a disk, flash memory, or a memory stick.

FIG. 3 illustrates an example of a custom channel model 132 for relating content selections to channels which further illustrates some examples of arrangements of the respective content selections for each channel in accordance with some examples of content ordering criteria in accordance with the present invention. In this example, the model 132 includes five custom TV channels of different genres: a News channel, a Drama channel, a Kids Movie Channel, a Comedy channel and a Real Estate channel. In each of these channels, content selections other than ads or previews is preceded by a channel identifier respectively as News Channel ID, Drama Channel ID, Kids Movie Ch. ID, Comedy Channel ID and RE Channel ID which assists a viewer in remembering what channel she is watching. Furthermore, in each of these examples, if the user comes to the end of the channel's content, the playlist returns to the beginning of the playlist to play content selections.

The arrangement of content selections for the News channel comprises a plurality of sub-units: a Today's News sub-unit, a separate Ads sub-unit, Previews of News Related Shows sub-unit, a Today's News Talk Shows sub-unit, and Previous News Talk Shows sub-unit. Sub-units are a convenient mechanism for allowing a user to go to a group of selections in a channel having a characteristic desired by the viewer. As news is important to a viewer for its timeliness, timeliness is a content ordering criteria for which placing news broadcasts for today's news are arranged in a sub-unit that comes first in the News channel playlist. Within this sub-unit, a viewer's viewing order pattern is a content ordering criteria. The viewer's habit is to view local news first, and then national or world news broadcasts afterwards or views national or world news to a lesser degree. Based on this indicated viewing order pattern in the personalized viewing profile 130, a local news show comes first in the sub-unit and channel in this case followed by a national news show and then a world news show. In this example, a sub-unit of advertisement content selections comes next in the ordered playlist followed by a sub-unit of Previews of News Related Shows. The ads and previews can be selected based on the personalized viewing profile, the demographic viewing profile, a genre (e.g., news, drama) of the channel, or a combination of any of these. In one example, the Ads can be a sub-unit that cannot be skipped, and is situated between two sub-units of new content so that they are likely to be viewed. For similar reasons, the previews for other content recommendations selected by the content selection module can be placed in order between new content. With timeliness as a content ordering criteria, Today's News Talk Shows are presented as a next sub-unit as talk shows are timely but not as timely as the news reports themselves. The order of the news content selections of "Hardball," the "O'Reilly Factor," and "CrossFire," are based on the viewer's viewing order or could be a viewer rating criteria indicating a downward scale of favorites (e.g. 5 to 1). Following Today's News Talk Shows are Previous News Talk Shows in which the news talk shows are ordered in reverse chronological order in the playlist to keep more current shows at the beginning of this sub-unit while keeping the viewer's viewing order.

The Drama channel's content uses a combination of content ordering criteria including whether a content selection has been played or not as well as clustered chronology and a viewer favorite rating. In this example, the first subunit is Unplayed Episodes of dramas which further includes three sub-units, the first of which is a cluster of unplayed episodes of the viewer's favorite, "ER", in chronological order as watching a drama out of order can be disconcerting. An Ads sub-unit follows before another sub-unit of a cluster of unplayed episodes of the viewer's second favorite, "CSI", in chronological order. A Previews sub-unit follows and serves to indicate to a viewer that the end of unplayed content has been reached in this example. The previews of drama content can be organized by a time to live or use by time value associated with the metadata of a preview. For example, Preview Drama 1 may be for a show of a different series airing later tonight while air times of Preview Drama 2 and Preview Drama 3 are progressively later in the week. A preview content selection may also have a parameter indicating a number of times it can be played before automatic deletion. Following the Previews of Other Drama Shows sub-unit, a Played Episodes sub-unit follows which orders the played episodes and another Ads selection according to the same criteria as for the Unplayed Episodes sub-unit.

Next in the channel lineup of this example is a Kids Movie Channel including two sub-units of G-Rated Movies organized by the criteria of most recently downloaded to least recently downloaded and a Previews of Other Kids Movies sub-unit including Preview Kids Movie 1, Preview Kids Movie 2 and Preview Kids Movie 3. In this example, the previews can also be ordered from most recently downloaded to least recently downloaded. For use in one or more embodiments, a preview can be deleted when the content selection with which it is associated is selected for inclusion in the custom channel model 132.

A comedy channel playlist example illustrates another example of a content ordering criteria. In this example, the playlist begins with an unplayed episodes sub-unit arranged in order from most recently downloaded to least recently downloaded, followed by an Ads sub-unit, a Previews of Other Comedies sub-unit, and a Played Episodes sub-unit. The content ordering criteria for the Played Episodes has a primary ordering criteria of highest viewer rating and a secondary ordering criteria of the age of the episode since downloading. In this way, if Joey Episode 2 (Ep. 2), Season 2 (S. 2) is rated five stars, each of Cheers Episode 7, Season 11 and Cheers Episode 8, Season 10 is rated four stars, and deletion of an episode is required for insertion of an unplayed episode in the channel, whichever of these two episodes of Cheers was downloaded last remains, and the other is deleted. Of course if the other episode is currently playing, it is not deleted.

The custom channel model 132 further includes a Real Estate Channel which includes three sub-units, a first in the playlist of Unplayed House Tours, next a sub-unit of Previews of House Tours to Come, and a last sub-unit of Played House Tours. With the Unplayed House Tours, the content ordering criteria is order from most recently posted house tour to least recently posted house tour. The Previews of Homes to Come can be ordered according to a time to live parameter associated with the preview. The Played House Tours can be ordered according to a Rating as a primary criteria and a time to live parameter as a secondary criteria so that tours with the highest viewer ratings are given preference to lower rated properties, and those with the least time remaining to live for a given rating level are ordered earlier in the playlist for the sub-unit. So, if the house tour for the Address 2 content selection and the house tours for the Address 3, Address 1, and Address 4 content selections have the same rating, the content ordering criteria 134 for the Real Estate Channel indicates that the Address 2 content selection has the shortest time to live, and the Address 4 content selection has the longest time to live.

Figure 4:
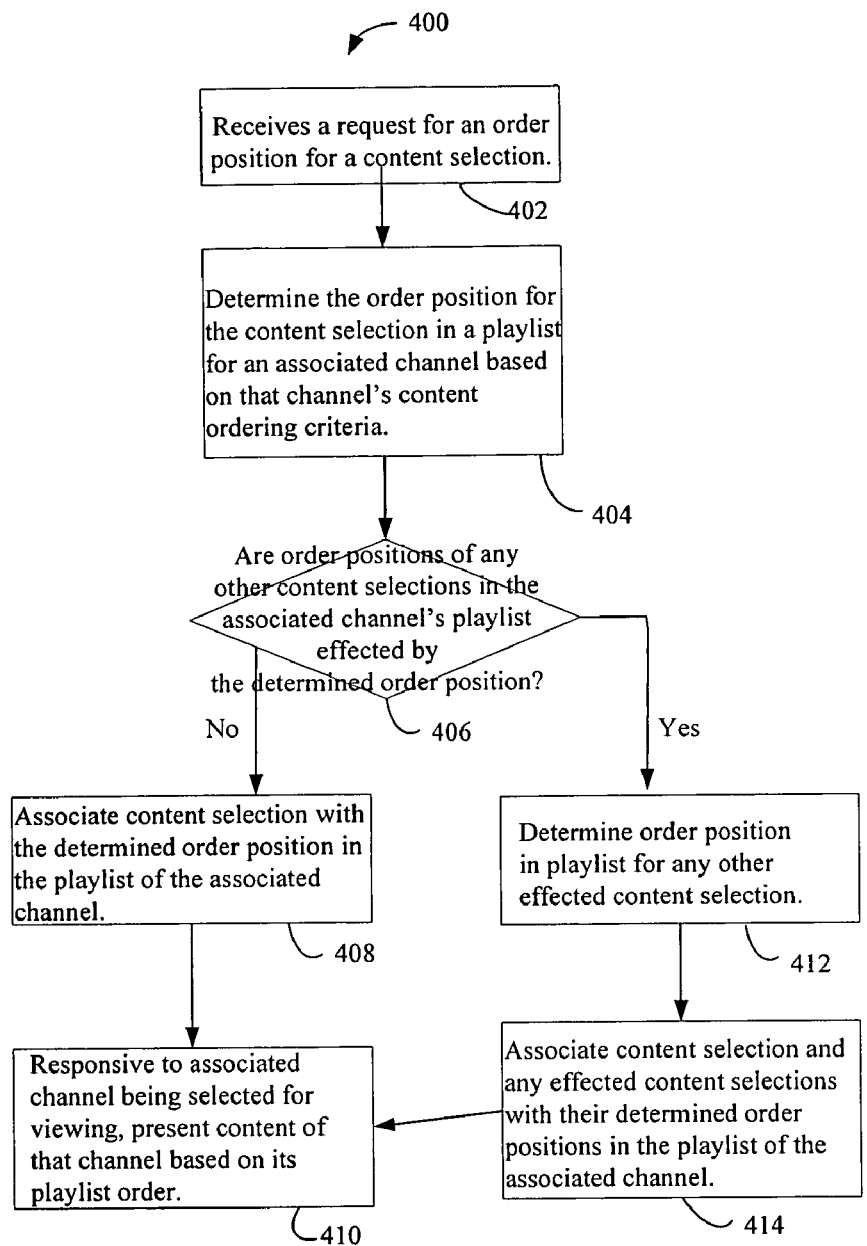
FIG. 4 is a flow diagram of a method for arranging content selections within a custom TV channel according to content ordering criteria in accordance with an embodiment of the present invention.

FIG. 4 is a flow diagram of a method for arranging content selections within a custom TV channel according to content ordering criteria in accordance with an embodiment of the present invention. For illustrative purposes only and not to be limiting thereof, the method embodiment 400 of FIG. 4 is discussed in the context of the system embodiment 200 of FIG. 2. The content arrangement module 206 receives 402 a request for an order position for a content selection and determines 404 the order position for the content selection in a playlist for an associated channel based on that channel's content ordering criteria 134. Some examples of events triggering a request for an order position are receipt of a new content selection, a viewer rating change, a viewer request to change the order position, a deletion of another content selection, or a content ordering criteria change. The content arrangement module 206 determines 406 whether there are order positions of any other content selections in the channel playlist effected by the determined order position. Responsive to a positive determination, the content arrangement module 206 determines 412 an order position in the playlist for any other effected content selections and associates 414 the content selection and any effected content selections with their determined order positions in the playlist of the associated channel. Responsive to a negative determination, the content arrangement module 206 associates 408 the content selection with the determined order position in the playlist of the associated channel. The updated playlist order is stored for the selected channel in the custom channel model 132, and responsive to the associated channel being selected for viewing, the user interface module 202 reads the playlist order for this channel from the custom channel model 132 and causes the player 137 to present 410 on the display 120 the content selections of the selected channel based on its playlist order.

In one example, the playlist for a channel includes an extra position for use in updating the playlist order when a new content selection is being added. With the extra position at the end of the playlist, the content selection assigned to the last playlist position according to the channel's content ordering criteria is deleted in a disk full or channel full situation. Additionally, an extra position can be useful when rearranging content selections within the channel.

Figure 5:
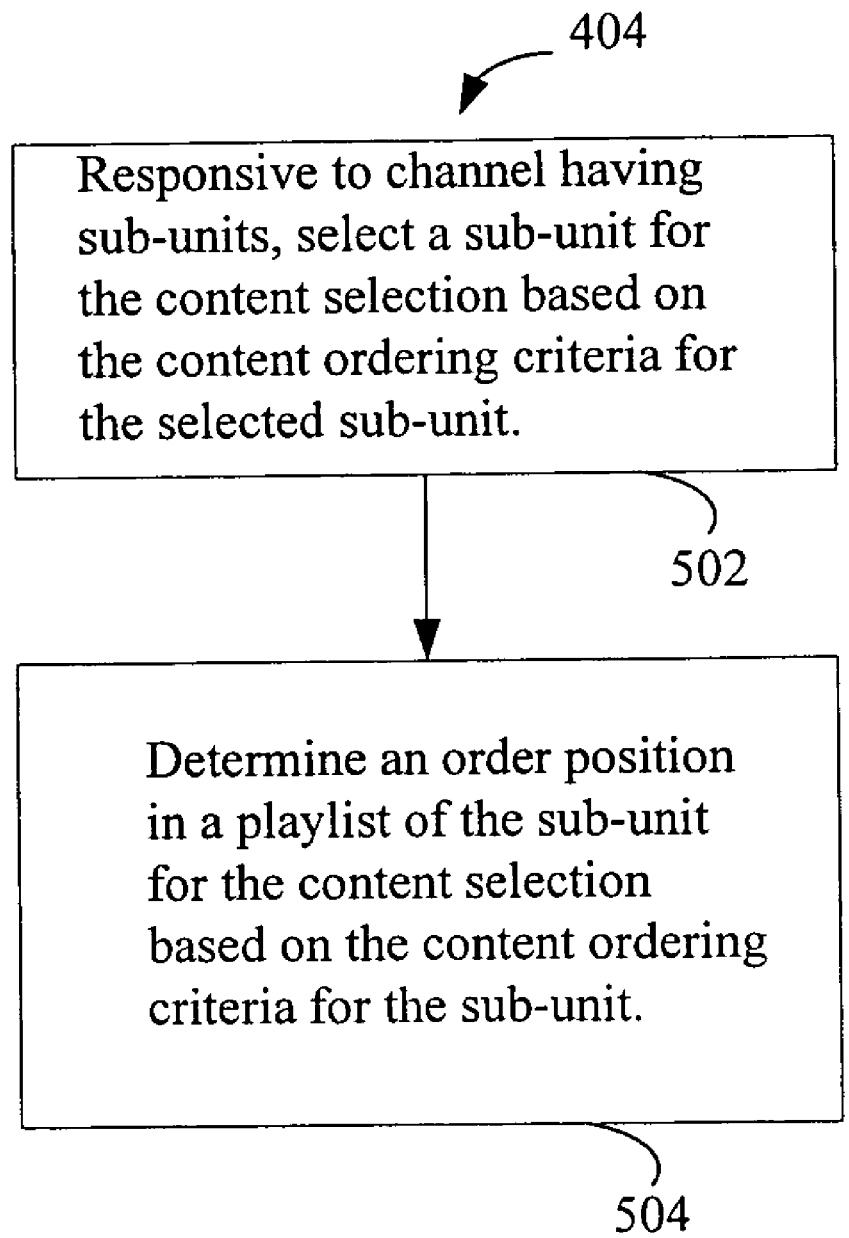
FIG. 5 is a flow diagram of a method for determining an order position in a playlist of a channel including sub-units for a content selection based on the channel's content ordering criteria in accordance with an embodiment of the present invention.

FIG. 5 is a flow diagram of a method 404 for determining an order position in a playlist of a channel for a content selection based on the channel's content ordering criteria in accordance with an embodiment of the present invention. For illustrative purposes only and not to be limiting thereof, the method embodiment 404 of FIG. 5 is discussed in the context of the system embodiment 200 of FIG. 2. The content arrangement module 206, responsive to a channel have sub-units, selects 502 a sub-unit for the content selection based on the content ordering criteria for the selected sub-unit, and determines 504 an order position in a playlist of the sub-unit for the content selection based on the content ordering criteria for the sub-unit. In one example, the custom channel model 132 includes a playlist order for the sub-units, and a separate playlist order for the selections within each sub-unit.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the hereto appended claims. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Of course, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming.

What is claimed is:

1. A method for arranging content selections within a custom TV channel according to a content ordering criteria for the custom TV channel comprising:
    receiving a request for an order position in a playlist of the custom TV channel for a content selection, wherein the playlist includes a list of previously selected content selections and an order for playing the previously selected content selections, and wherein the content selections within the custom TV channel include recorded content and streamed broadcasts; and
    determining, by a processor, the order position for the content selection in the playlist based on the content ordering criteria for the custom TV channel such that:
        responsive to a channel having sub-units, selecting a sub-unit for the content selection based on the content ordering criteria for the selected sub-unit; and
        determining the order position in the playlist of the sub-unit for the content selection based on the content ordering criteria for the sub-unit; and
    wherein the order position identifies a position in the order of the playlist for playing the content selection.

2. The method of claim 1 wherein the content ordering criteria includes a genre associated with the custom TV channel.

3. The method of claim 1 wherein the content ordering criteria includes chronology with respect to another criteria.

4. The method of claim 3 wherein the other criteria is order of being recorded.

5. The method of claim 3 wherein the other criteria is order of being played.

6. The method of claim 3 wherein the other criteria is order of being broadcast on either broadcast television or the Internet.

7. The method of claim 1 wherein content ordering criteria includes chronology of a series of content selections.

8. The method of claim 1 wherein the content ordering criteria includes clustered chronology criteria of clustering content selections of a same series together in the playlist and placing them in chronological order.

9. The method of claim 1 wherein the content ordering criteria includes source of content criteria.

10. The method of claim 1 wherein the content ordering criteria includes a viewer's typical viewing order of types of content selections.

11. The method of claim 1 wherein the content ordering criteria includes whether the content selection has been played or not.

12. The method of claim 1 wherein the content ordering criteria includes viewer ratings.

13. The method of claim 1 wherein the content ordering criteria includes ratings for age appropriateness used by a television industry.

14. The method of claim 1 wherein the content ordering criteria includes a time to live parameter associated with the selection as a basis for ordering a content selection in a playlist.

15. The method of claim 1 wherein the content ordering criteria includes relative order of being most recently downloaded as a basis for ordering a content selection in a playlist.

16. The method of claim 1, further comprising:
  searching contents provided by content providers based on the content ordering criteria to select the content selections for the custom TV channel.

17. A system for arranging content selections within a custom TV channel according to a content ordering criteria for the custom TV channel, the system comprising:
  a memory storing a custom channel model storage module including a selection of channels including a custom TV channel and an ordered playlist for the custom TV channel, wherein the playlist includes a list of previously selected content selections and an order for playing the previously selected content selections, and wherein the content selections within the custom TV channel include recorded content and streamed broadcasts;
  a channel content ordering criteria storage module including content ordering criteria for the custom TV channel;
  a content arrangement module having access to the custom channel model storage module and the channel content ordering criteria storage module which arranges content selections within the ordered playlist of the custom TV channel according to the content ordering criteria for the custom TV channel, the content arrangement module to determine an order position for the content selection in the playlist based on that channel's content ordering criteria by selecting a sub-unit for the content selection based on the content ordering criteria for the selected sub-unit responsive to a channel having sub-units and determining the order position in the playlist of the sub-unit for the content selection based on the content ordering criteria for the sub-unit; and
  a processor for executing one or more modules stored in the memory.

18. The system of claim 17 further comprising:
  a personalized viewing profile storage module including a viewing order pattern for content selections of a genre type being accessible to the content arrangement module as a content ordering criteria for the custom TV channel.

19. The system of claim 17 further comprising:
  a personalized viewing profile storage module including viewer ratings of one or more content selections being accessible to the content arrangement module as a content ordering criteria for the custom TV channel.

20. The system of claim 17 wherein the custom channel model storage module, the ordered playlist for the custom TV channel includes a playlist order for sub-units of the channel, and a playlist order for the selections within each sub-unit.

21. The system of claim 17, further comprising:
  a content selection module to search contents provided by content providers based on the content ordering criteria to select the content selections for the custom TV channel.

22. A non-transitory computer usable medium comprising instructions for causing a processor to execute a method for arranging content selections within a custom TV channel according to a content ordering criteria for the custom TV channel, the method comprising:
  receiving a request for an order position in a playlist of the custom TV channel for a content selection, wherein the playlist includes a list of previously selected content selections and an order for playing the previously selected content selections, and wherein the content selections within the custom TV channel include recorded content and streamed broadcasts; and
  determining the order position for the content selection in the playlist based on that channel's content ordering criteria such that:
    responsive to a channel having sub-units, selecting a sub-unit for the content selection based on the content ordering criteria for the selected sub-unit; and
    determining the order position in the playlist of the sub-unit for the content selection based on the content ordering criteria for the sub-unit; and
  wherein the order position identifies a position in the order of the playlist for playing the content selection.

23. The non-transitory computer usable medium of claim 22, wherein the streamed broadcasts are live and not recorded.

24. The non-transitory computer usable medium of claim 22, further comprising:
  searching contents provided by content providers based on the content ordering criteria to select the content selections for the custom TV channel.

* * * * *

UNITED STATES PATENT AND TRADEMARK OFFICE
CERTIFICATE OF CORRECTION

| | | |
|---|---|---|
| PATENT NO. | : 8,255,953 B1 | Page 1 of 1 |
| APPLICATION NO. | : 11/174260 | |
| DATED | : August 28, 2012 | |
| INVENTOR(S) | : James A. Rowson et al. | |

It is certified that error appears in the above-identified patent and that said Letters Patent is hereby corrected as shown below:

On the Title page, in Item (73), Assignee, in column 1, line 1, delete "Devlopment" and insert -- Development --, therefor.

In the Claims:

In column 8, lines 20-21, in Claim 1, delete "channel such that: responsive" and insert -- channel; and in response --, therefor.

In column 9, line 18, in Claim 17, before "a content" insert -- said memory contains --.

In column 10, line 5, in Claim 21, after "claim 17," insert -- wherein said memory --.

In column 10, lines 24-25, in Claim 22, delete "criteria such that: responsive" and insert -- criteria; and in response --, therefor.

Signed and Sealed this
Twenty-third Day of April, 2013

Teresa Stanek Rea
*Acting Director of the United States Patent and Trademark Office*